US008732094B2

(12) United States Patent
Rosa et al.

(10) Patent No.: US 8,732,094 B2
(45) Date of Patent: May 20, 2014

(54) ENFORCEMENT OF SECURITY REQUIREMENTS FOR A BUSINESS MODEL

(75) Inventors: Nelson Souto Rosa, Pernambuco (BR); Fernando Antonio Aires Lins, Pernambuco (BR); Robson Wagner Albuquerque de Medeiros, Pernambuco (BR); Paulo Romero Martins Maciel, Pernambuco (BR); Julio Cesar Damasceno, Pernambuco (BR); Bruno Leonardo Barros Silva, Pernambuco (BR); Andre Ricardo da Silva Souza, Pernambuco (BR); Bryan Stephenson, Alviso, CA (US); Hamid Reza Motahari-Nezhad, Sunnyvale, CA (US); Jun Li, Mountain View, CA (US); Caio Northfleet, Rio Grande do Sul (BR)

(73) Assignee: Hewlett-Packard Development Company, L.P., Houston, TX (US)

(*) Notice: Subject to any disclaimer, the term of this patent is extended or adjusted under 35 U.S.C. 154(b) by 629 days.

(21) Appl. No.: 12/847,763

(22) Filed: Jul. 30, 2010

(65) Prior Publication Data

US 2012/0030120 A1 Feb. 2, 2012

(51) Int. Cl.
*G06Q 99/00* (2006.01)
*G06Q 10/06* (2012.01)

(52) U.S. Cl.
CPC .................................. *G06Q 10/067* (2013.01)
USPC ........................................................ 705/348

(58) Field of Classification Search
USPC ........................................................ 705/348
See application file for complete search history.

(56) References Cited

U.S. PATENT DOCUMENTS

| 7,114,146 | B2 | 9/2006 | Zhang et al. |
| 7,444,522 | B1 | 10/2008 | Chang et al. |
| 7,516,476 | B1 | 4/2009 | Kraemer et al. |
| 7,565,640 | B2 | 7/2009 | Shukla et al. |
| 7,567,915 | B2 | 7/2009 | Hammitt et al. |
| 2003/0046583 | A1 | 3/2003 | Goldman et al. |
| 2004/0019807 | A1 | 1/2004 | Freund |
| 2004/0024622 | A1 | 2/2004 | Knight |
| 2004/0162741 | A1 | 8/2004 | Flaxer et al. |
| 2007/0038490 | A1* | 2/2007 | Joodi ................................ 705/7 |
| 2007/0265895 | A1 | 11/2007 | Moore |
| 2008/0033993 | A1 | 2/2008 | Uceda-Sosa |
| 2008/0141336 | A1* | 6/2008 | Haller ............................... 726/1 |
| 2009/0006167 | A1 | 1/2009 | Toussaint et al. |
| 2009/0007056 | A1* | 1/2009 | Prigge et al. ................. 717/104 |
| 2009/0007219 | A1 | 1/2009 | Abzarian et al. |

(Continued)

FOREIGN PATENT DOCUMENTS

WO WO2005052720 6/2005

OTHER PUBLICATIONS

"Business Process Model and Notation (BPMN)", Version 1.2, OMG Document Number: formal/2009-01-03, Standard document URL: http://www.omg.org/spec/BPMN/1.2, 316 pages, Object Management Group, Jan. 2009.*

(Continued)

*Primary Examiner* — James D Nigh

(57) ABSTRACT

A functional model of a business process which is annotated with security requirements is provided. Platform-specific executable code and at least one configuration file for a given security enforcement component to enforce the security requirements of the model are then generated automatically.

14 Claims, 6 Drawing Sheets

(56) References Cited

U.S. PATENT DOCUMENTS

| | | | |
|---|---|---|---|
| 2009/0077621 A1* | 3/2009 | Lang et al. | 726/1 |
| 2009/0099860 A1* | 4/2009 | Karabulut et al. | 705/1 |
| 2009/0099882 A1* | 4/2009 | Karabulut | 705/7 |
| 2009/0132562 A1* | 5/2009 | Mehr et al. | 707/100 |
| 2009/0171720 A1 | 7/2009 | Crook et al. | |
| 2009/0248698 A1* | 10/2009 | Rehmann | 707/10 |
| 2009/0281865 A1 | 11/2009 | Stoitsev | |
| 2010/0218082 A1* | 8/2010 | Charfi | 715/230 |
| 2011/0004565 A1* | 1/2011 | Stephenson et al. | 705/348 |
| 2011/0077999 A1* | 3/2011 | Becker et al. | 705/10 |
| 2011/0088011 A1* | 4/2011 | Ouali | 717/105 |
| 2011/0093916 A1* | 4/2011 | Lang et al. | 726/1 |

OTHER PUBLICATIONS

Philippe Ameline; Rose Dieng-Kuntz N/A, Medical Ontology & Virtual Staff for Knowledge Management in a Health Network, <http://www.inria.fr/valorisation/rencontres/sante/transparents/ameline.pdf+.

Jiangning Wu Institute of Systems Engineering, Dalian University of Technology, A Framework for Ontology-Based Knowledge Management System, < http://www.iiasa.ac.at/~marek/ftppub/Pubs/csm05/wu.pdf.

B. Ramamurthy, Ontology-based Knowledge Management in the Steel Industry, www.cse.buffalo.edu/~bina/ie565/spring2009/MittalSteelApr14.ppt.

http://www.sap.com/netherlands/platform/netweaver/pdf/brochures/BWP_NetWeaver_BPM.pdf, Business Process Management with SAP NetWeaver.

http://www.imsglobal.org/SOA/soawpv1p0/imsSOAWhitePaper_v1p0.html#Xaa1756387, Adoption of Service Oriented Architecture for Enterprise Systems in Education: Recommended Practices, Publication Date: Sep. 2009.

Ardissono, L.; Goy, A.; Petrone, G.; Segnan, M., From Service Clouds to User-Centric Personal Clouds, http://ieeexplore.ieee.org/stamp/stamp.jsp?tp=&isnumber=5283545&arnumber=5284056, pp. 1-8; Publication Date Sep. 2009.

http://www.keymarkinc.com/images/PDFs/Centralized%20Shared%20Services%20White%20Paper.pdf, The Correct Shared Services Model Increases Business Process Efficiencies.

* cited by examiner

ENFORCEMENT OF SECURITY REQUIREMENTS FOR A BUSINESS MODEL

TECHNICAL FIELD OF THE INVENTION

The invention generally relates to enforcement of security requirements for a business model.

BACKGROUND

Business managers typically use business process modeling tools to define a business process using a particular standard notation. The business process modeling tool typically permits a business manager to define steps of a business process and define various attributes for certain types of elements of the business process, such as data types, task types and tasks.

DETAILED DESCRIPTION

A business analyst or business manager may use a modeling tool to develop a model (called a "business process model," or "BPM") for a particular business process using a defined standard notation. The modeling tool allows the business manager to define steps in the business process as well as define attributes for certain types of elements of the business process, such as data types, task types and tasks. For example, the business analyst may define that a certain document of the BPM is confidential. Furthermore, the business manager may impose additional constraints related to the degree of the defined attribute. For example, for a business element that is designated as being "confidential," the business manager may further denote whether the business element is highly confidential or has some lesser degree of confidentiality.

After the business manager completes the initial BPM, a security analyst may then annotate the BPM to impose specific security requirements. For example, the security analyst may annotate that certain business elements are to be protected with a specific type of security mechanism or service. For example, the security analyst may designate that certain tasks, such as tasks that involve communicating credit card information to a bank, use encryption when performing this communication. Furthermore, the security analyst may specify the specific type of encryption that is used. The security analyst may specify other types of security actions, mechanisms and services to varying degrees of specificity, such as those that involve authentication, access control, and audit logging.

Systems and techniques are disclosed herein for purposes of developing a BPM and annotating the BPM with security and service extensions using computer-aided selection of candidates for the security and service extensions. As described herein, the computer recommends these candidates based on selections (selections made by users, for example) that were made in the development of previous BPMs. As further described below, the systems and techniques disclosed herein produce files that are processing platform independent; and these files may be further processed to produce processing platform specific files for implementing the annotated BPM with specific orchestration engines and security mechanisms.

Figure 1:
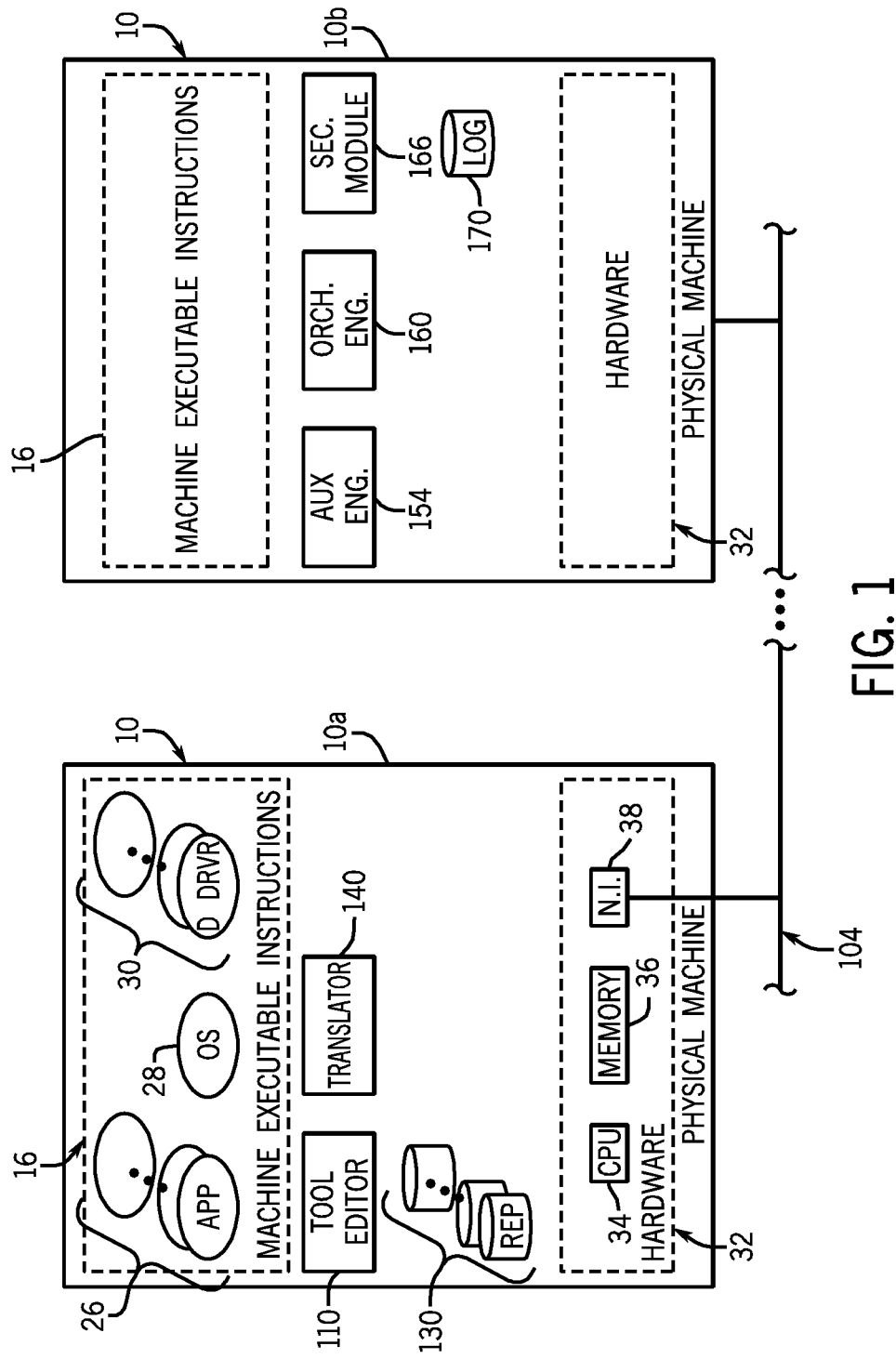
FIG. 1 is a schematic diagram of a processing system according to an example implementation.

Referring to FIG. 1, as a non-limiting example, the systems and techniques that are disclosed herein may be implemented on an architecture that includes one or multiple physical machines 10 (physical machines 10a and 10b, being depicted in FIG. 1, as examples). In this context, a "physical machine" indicates that the machine is an actual machine made up of executable program instructions and hardware. Examples of physical machines include computers (e.g., application servers, storage servers, web servers, etc.), communications modules (e.g., switches, routers, etc.) and other types of machines. The physical machines may be located within one cabinet (or rack); or alternatively, the physical machines may be located in multiple cabinets (or racks).

As shown in FIG. 1, the physical machines 10 may be interconnected by a network 104. Examples of the network 104 include a local area network (LAN), a wide area network (WAN), the Internet, or any other type of communications link. The network 104 may also include system buses or other fast interconnects.

In accordance with a specific example described herein, one of the physical machines 10a contains machine executable program instructions and hardware that executes these instructions for purposes of recommending candidate refinements of security requirements for a functional model (i.e., a BPM) of a business process, modifying these recommended candidate refinements and/or selecting candidate services to perform tasks of the BPM that can meet the refined security requirements. The processing by the physical machine 10a results in generating processing platform independent files, which describe the annotated BPM and its associated security features and services (collectively referred to as the "annotated BPM" herein). Another one of the physical machines 10b for this example represents the environment in which the annotated BPM is implemented. The physical machine 10b contains machine executable instructions and hardware that executes the program instructions for purposes of generating processing platform specific files and executing these files to implement the annotated BPM.

It is noted that in other implementations, all or part of the above-described generation of the annotated BPM model as well as the implementation of the BPM may be performed on a single physical machine 10 or on more than two physical machines 10. Therefore, many variations are contemplated and are within the scope of the appended claims.

The architecture that is depicted in FIG. 1 may be implemented in an application server, a storage server farm (or storage area network), a web server farm, a switch or router farm, other type of data center, and so forth. Also, although two physical machines 10a and 10b are depicted in FIG. 1, it is noted that more than two physical machines 10 or one physical machine 10 may be used in accordance with other implementations. Additionally, although each of the physical machines 10 is depicted in FIG. 1 as being contained within a box, it is noted that a physical machine 10 may be a distributed machine having multiple nodes, which provide a distributed and parallel processing system.

As depicted in FIG. 1, in some implementations the physical machine 10a may store machine executable instructions 16. These instructions 16 may include one or multiple applications 26, an operating system 28 and one or multiple device drivers 30 (which may be part of the operating system 28). In general, the machine executable instructions are stored in storage, such as (as non-limiting examples) in a memory (such as a memory 36) of the physical machine 10, in removable storage media, in optical storage, in magnetic storage, in non-removable storage media, in storage separate (local or remote) from the physical machine 10, etc., depending on the particular implementation.

The physical machine 10a may also include hardware 32, which includes a processor, such as one or multiple central processing unit (CPUs) 34 (one CPU 34 being depicted in FIG. 1 for purposes of a non-limiting example). Each CPU 34 may have one or multiple processing cores. The hardware 32 may also include the system memory 36 and a network interface 38. In some implementations, one or multiple CPUs 34 execute the machine executable instructions 16.

In general, the physical machine 10a, for this example, includes a set of machine executable instructions, called a "tool editor 110" which is responsible for (1) creating an initial BPM with user input, (2) annotating this model with refinements of security requirements and (3) further refining the BPM with the services to perform the business process tasks, to create a resulting annotated BPM, as further described below.

The tool editor 110 may be aided by security and services data repositories 130 that are stored on or accessible by the physical machine 10a. In general, the repositories 130 contain data indicative of previous annotations made in the development of prior annotated BPMs. Therefore, by consulting the repositories, the tool editor 110 may make recommended annotations for the current BPM.

As depicted in FIG. 1, the physical machine 10a, in some implementations, may store another set of machine executable instructions, called a "translator 140," which when executed by one or multiple CPUs 34 transforms the annotated BPM developed using the tool editor 110 into processing platform independent files that describe the annotated BPM.

In general, the physical machine 10b may contain machine executable instructions 16 and hardware 32, similar to the corresponding instructions 16 and hardware 32 of the physical machine 10a. For this example, the physical machine 10b represents the specific machine that implements the annotated BPM. For this function, the physical machine 10b contains a set of machine executable instructions, called "an auxiliary engine 154," which when executed by one or multiple CPUs of the physical machine 10b transforms the processing platform independent files (generated by the translator 140) into processing platform specific files. More specifically, the auxiliary engine 154 produces files that are specific for a set of machine executable instructions, called an "orchestration engine 160," of the physical machine 10b. When these instructions are executed by one or multiple CPUs of the physical machine 10b, the orchestration engine 160 functions as a security enforcement component to implement the security features specified by the annotated BPM and executes the process model by interpreting the processing platform specific files, using the aid of a security services log 170 and security module 166, as further described below.

Figure 2:
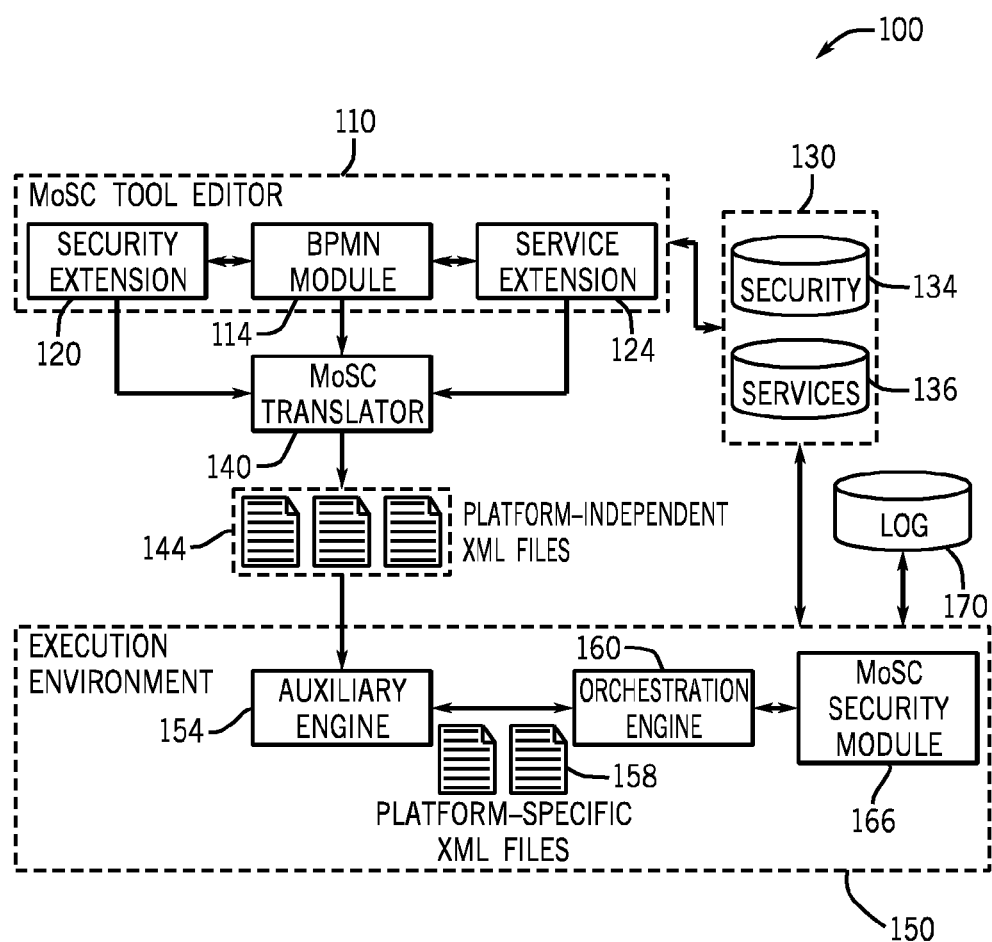
FIG. 2 is a schematic diagram of an architecture to determine security requirements and services for a business process according to an example implementation.
Figure 3:
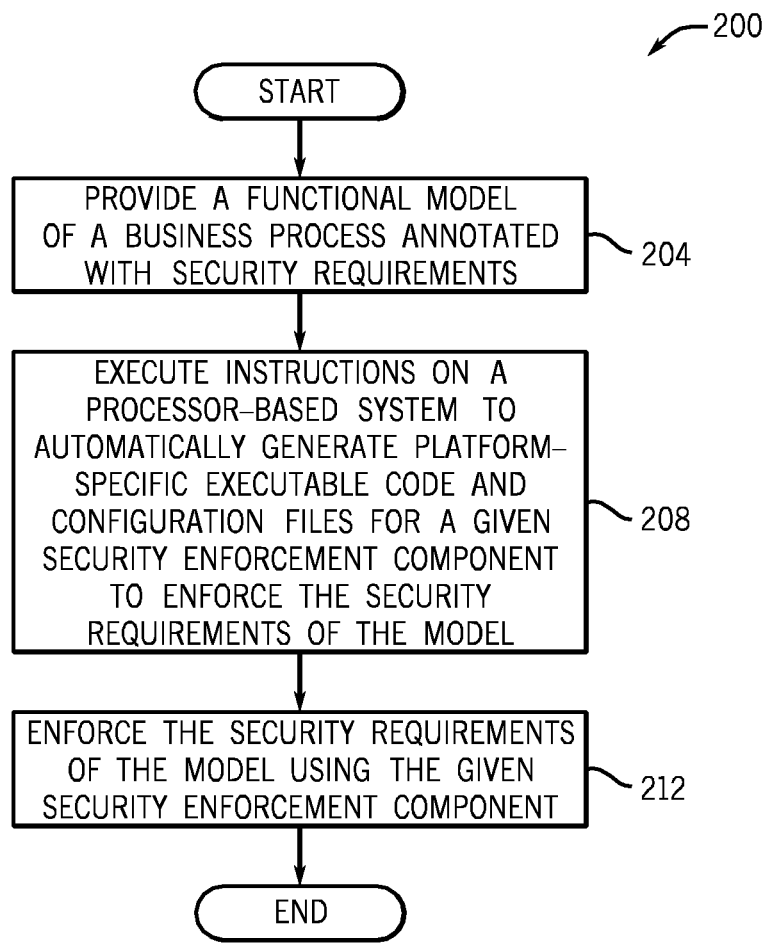
FIG. 3 is a flow diagram of a technique to allow platform-specific enforcement of security requirements for a business process model according to example implementations.

FIG. 2 depicts an exemplary architecture 100 for developing and using an annotated BPM. As described below, the architecture 100 may be used in general to perform a technique 200 that is depicted in FIG. 3. Referring to FIG. 3, the technique 200 includes providing (block 204) a functional model of a business process that is annotated with security requirements and executing (block 208) instructions on a processor-based system to automatically generate platform-specific executable code and at least one configuration file for a given security enforcement component to enforce the security requirements of the model. The technique 200 further includes enforcing (block 212) the security requirements of the model using this given security enforcement component.

Referring to FIG. 2, in accordance with some implementations, the tool editor 110 may be used to develop or provide a functional model of a business process (i.e., a BPM). The BPM includes a collection of tasks. This development may be aided with input from a business manager or analyst, security expert, or other domain expert. The tool editor 110 allows the business manager or security expert to perform refinements of security requirements for the BPM. Instead of having to annotate the security requirements from scratch, the tool editor 110 provides a user interface to allow a user to selectively modify, accept or reject the recommended candidate refinements of security requirements that are based on, for example, a refinement of security requirements that has been created from a similar business process defined before. Then, the tool editor 110 recommends the candidate services stored in the services repositories 136 to perform the tasks while meeting the refined security requirements. The tool editor 110 also provides a user interface to allow a user to choose a target service out of the recommended candidate services for the business process step. As examples, the user can reject, accept or modify the recommended candidate services.

Turning to the more specific details of the architecture 100, in some implementations, the tool editor 110 includes a Business Process Model Notation (BPMN) module 114 that provides support at modeling/development time and has a user interface (a graphical user interface (GUI), for example) to allow initial development of the BPM with input from a business manager. This initial development includes annotating the BPM with a certain business process design and security requirements, as specified by the manager or others. This initial development may also include annotating the BPM with certain service selections. The BPMN module 114 further relies on a security extension module 120 and a service extension model 124 of the tool editor 110 for annotation of the BPM.

More specifically, the BPMN module 114 allows the business manager to define a business process using standard BPMN notation, in accordance with some implementations. In general, the BPMN notation provides functional specification of the business process. The security extension module 120 provides support to model and automatically refine the security requirements and bind them to BPMN elements, such as data, tasks and task types. As a non-limiting example, the security extension module 120 may, based on past selections made by the business manager/security analyst, automatically determine that a data item designated as being confidential needs to be encrypted.

The service extension module 124 is constructed to be responsible for the annotation of service information into the BPM and is responsible for binding the BPM with services to execute the task or tasks specified in the BPM. Moreover, recommendations for the annotation of the BPM by the service extension module 124 may be automatic based on past selections that were made by a user. For example, if a task "Process Credit Card Payment" is part of the BPM, the service extension module 124 may automatically recommend one or more candidate services from the repository that can accomplish this task. The recommended selections by the security extension module 120 and service extension module 124 may be overridden, changed or otherwise refined by a user (business manager, security analyst, or other user) using the BPMN module's user interface.

The security extension module 120 and service extension module 124 are connected to security 134 and services 136 repositories (part of the repositories 130). The repositories 130 store information that is available to the BPMN module 114 and the modules 120 and 124 to aid users in the business process design, service selection and refinement of security requirements. The services repository 136 stores a set of functional information about the web services or other types of services. In the case of web services, this information includes the name of the services and corresponding unique resource identifiers (URI), the service operations and the web service description language (WSDL) files. The services repository 136 also includes security properties and capabilities for each service.

The security repository 134, in accordance with some implementations, stores the knowledge captured from the business analysts and security experts to map high level security requirements (such as high confidentiality, typically defined by business analysts, for example) to a particular set of security actions (cryptography actions, authentication actions, etc., which are typically defined by the security experts) and their associated properties (such as the use of an AES encryption algorithm that uses 128 bit keys, as a non-limiting example). Such knowledge allows the recommendation to the user to contain a complete set of the detailed refinement of the security requirements, once the high-level security requirements (for example, high confidentiality) are selected by the user. Any specific resources used to execute the services are also stored in the services repository 136. An example of this latter type of resource is a digital certificate that is used to represent the identity of a participant web service.

In general, the BPMN module 114 provides three abstractions to express security requirements on business process models: NF-Attribute, NF-Statement and NF-Action. The NF-Attribute abstraction models non-functional requirements, such as confidentiality, for example. The NF-Statement represents constraints related to the NF-Attributes, such as High Confidentiality, for example. The NF-Action abstraction refers to detailed technical mechanisms that realize NF-Attributes, such as certain cryptographic services to encrypt data, for example. In general, the user interface of the BPMN module 114 is used by a business manager or business process designer to annotate a BPMN model with a set of high level business security requirements using the NF-Attribute and NF-Statement abstractions.

Figure 4:
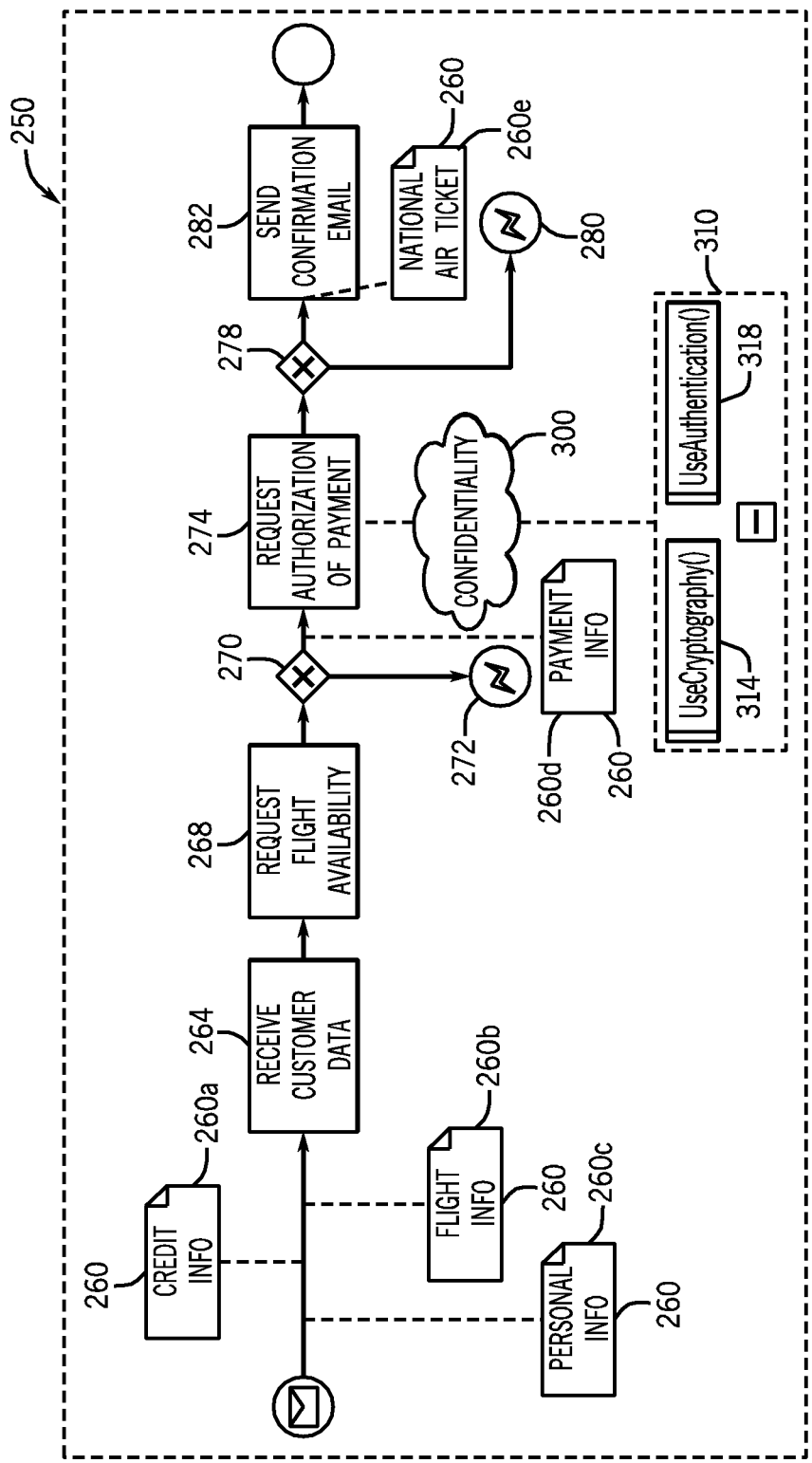
FIG. 4 is an illustration showing the development of a business process model and the annotation of the model with security requirements according to an example implementation.

As an example, FIG. 4 depicts an exemplary BPM 250, which is modeled and annotated using the tool editor 110, in accordance with some implementations. For this example, the business process being modeled is a process to reserve an airline reservation and send a corresponding ticket to a customer. The BPM 250 relies on input business data elements 260, such as payment information 260a (credit card information, for example), flight information 260b and personal information 260c; generates intermediary business data elements such as payment information 260d; and generates output business data elements, such as an airline ticket 260e.

The first step of the BPM 250 includes receiving customer data, pursuant to block 264. Next, flight availability is requested, pursuant to block 268. In the BPM 250, a decision is performed at gateway 270 to determine whether a flight is available and if not, an exit 272 occurs. Otherwise, if a flight is available, then the BPM 250 includes requesting authorization of payment using the payment information 260d, pursuant to block 274. If payment is authorized, pursuant to gateway 278, then the ticket 260e is communicated via an email, pursuant to block 282.

Referring to FIG. 4 in conjunction with FIG. 2, after the business manager completes the above-described initial BPM, the security extension module 120 recommends the candidate refinements of security requirements for annotating the BPM, and the service extension module 124 recommends the candidate services for annotating the BPM.

For this example, the security extension module 120 annotates the request for authorization of payment 274 as being confidential, as indicated at element 300. It is noted that the tool editor 110 in conjunction with the security extension module 120 is constructed to automatically recognize when a particular task, task type or data element is to be annotated with a particular security designation. This can be based on similar annotations for other past BPMs, using data flow analysis to propagate security requirements as data moves among services, using machine learning techniques, or other methods. In this regard, in accordance with implementations, the tool editor 110 applies an adaptive process to suggest annotations to business elements based on the manner in which these business elements were annotated in previous business models. Therefore, for this example, the tool editor 110 recognizes the authorization of payment 274 and automatically designates the request 274 as being confidential as in prior models which use payment authorization services. The user may accept, reject or otherwise modify this designation.

Figure 5:
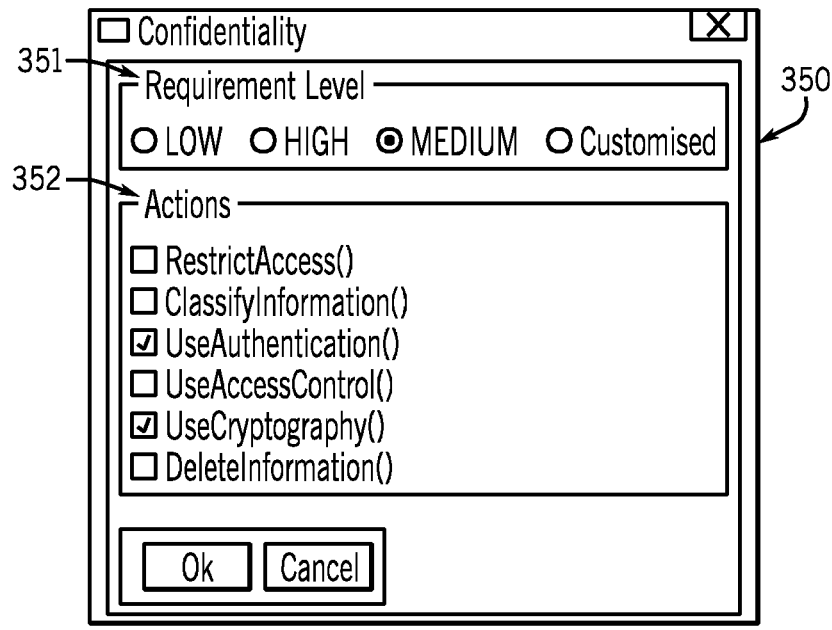
FIG. 5 is a screen shot illustrating an exemplary user interface for specifying security requirements according to an example implementation.

As also illustrated in the exemplary BPM 250 that is depicted in FIG. 4, the tool editor 110 further annotates the model with the confidentiality annotation 300 with specific security actions 310. For this, the security extension module 120 recognizes specific security actions applied in the past to the confidential designation and retrieves the specific actions from the security repository 134 (see FIG. 2) and recommends these actions to the user by populating the model with these actions. For this specific example, the actions are specific cryptography actions 314 and specific authentication actions 318. Referring also to FIG. 4, in a particular example, by "clicking" on the cloud 300, a corresponding graphical user interface (GUI) 350 may appear, which is depicted in FIG. 5 to present the recommended actions. As depicted in FIG. 5, the GUI 350 by default indicates (in field 351) selection of a particular confidentiality level, in accordance with some implementations. For this example, the medium confidentiality level is selected, in accordance with some implementations. Thus, the security extension module 120 automatically selects the medium confidentiality requirement, as the security extension module 120 recognizes this designation from previous models which use payment authorization services. For this medium confidentiality level, the security extension module 120 recommends specific actions based on previous BPM annotations. For this example, the GUI 350 depicts the initial recommended actions, such as an action to use authentication and an action to use cryptography, as designated by blocks 314 and 318 in FIG. 4 and by the actions field 352 of the GUI 350.

For the above-described example, a business manager and/or security analyst may override the recommended attributes and actions of the BPM (i.e., the business manager and/or security analyst may selectively accept, reject or otherwise refine these recommended candidates). For the example depicted in FIGS. 4 and 5, a business analyst may determine that the information submitted to request authorization of payment may need to be designated as being highly confidential. For this selection, the security extension module 120 subsequently selects a different set of actions, corresponding to this increased confidentiality level, in accordance with past actions used for this higher level. Furthermore, the security analyst may override the recommended selections of the actions to be taken for a particular confidentiality level. As also depicted in FIG. 5, the business manager or security analyst may select a customized confidentiality level, which allows actions not set forth in FIG. 5. Thus, many implementations are contemplated and are within the scope of the appended claims.

Referring to FIG. 2, among the other features of the architecture 100, the translator 140 is constructed to map all of the information in the annotated BPM into a set of platform-independent instructions, such as XML files 144, which are used to generate configuration files and executable code for a specific platform, such as platform specific XML files 158. The translator 140 takes the annotated BPM as an input and generates, in accordance with some implementations, three platform independent files: a security information file, a service orchestration specification file and a service information file. The security information file includes information for specific security enforcement actions expressed in the annotated BPM. The service orchestration specification file is a platform independent version of the functional executable code (Web Service-Business Process Execution Language (WS-BPEL) code, for example). The service information file is an example of a configuration file that includes information (such as URI, partner links, operation names, etc.), which are used to enrich the service orchestration specification file to perform calls to selected services.

In accordance with some implementations, the architecture 100 includes an execution environment 150 that transforms the platform independent XML files 144 into the platform specific files 158 and includes an orchestration engine 160 for purposes of executing the files 158. More specifically, in accordance with some implementations, the execution environment 150 includes an enforcement auxiliary engine 154 that has the following responsibilities. First, the auxiliary engine 154 transforms the platform independent XML files 144 and generates the corresponding platform-specific XML files 158. Additionally, the auxiliary engine 154, in accordance with some implementations, implements additional security enforcement mechanisms. For example, the auxiliary engine 154 realizes security requirements such as restricted access, which are not provided by some implementations of the orchestration engine 160 and existing security enforcement modules. The auxiliary engine 154 also coordinates enforcement of security requirements in the orchestration engine 160 and external security modules 166.

More specifically, the auxiliary engine 154 transforms the platform independent XML files 144 into platform specific configuration files. The enforcement actions are realized by the generation of platform specific configuration files for the orchestration engine 160, the security module 166 and external security modules. The configuration file generation is performed by the auxiliary engine 154 through combining the information from the platform independent files 144 with platform specific adapters for each security module 166 and each orchestration engine 160. Each adapter provides the configuration information in order to enforce the specific requirements. The additional security enforcement mechanisms implemented by the auxiliary engine 154 include some NF-Actions not supported by current security modules within the orchestration engines 160. The security module 166 implements additional security enforcement mechanisms to support these NF-Actions. Examples of the NF-Actions are actions to restrict access and logging (pursuant to a log 170) of runtime security information across the composition of services. The execution environment 150 relies on information that is stored in a log repository 170. In general, the log repository 170 stores runtime execution information that is collected from the auxiliary engine 154 and the security module 166 and pertains to the enforcement of the security requirements.

The orchestration engine 160 has the role of executing the composed business process (by running platform-specific BPEL code, for example). The actions by the orchestration engine 160 are configured by the auxiliary engine 154, which configures the orchestration engine and the external security modules to activate supported security enforcement mechanisms. The auxiliary engine 154 intercepts messages to/from the orchestration engine 160 to/from other services to enforce other security requirements, which are not supported by the orchestration engine 160 and external security mechanisms, in accordance with some implementations. Additionally, the auxiliary engine 154 monitors and analyzes the log file 170 for predetermined patterns of violations of security requirements according to these requirements. Examples are violations due to either the errors in the code translation or in the case that the developer or operator modifies the configuration so that the modified configuration does not conform to the security requirements. The auxiliary engine 154 reports these runtime violations.

Figure 6:
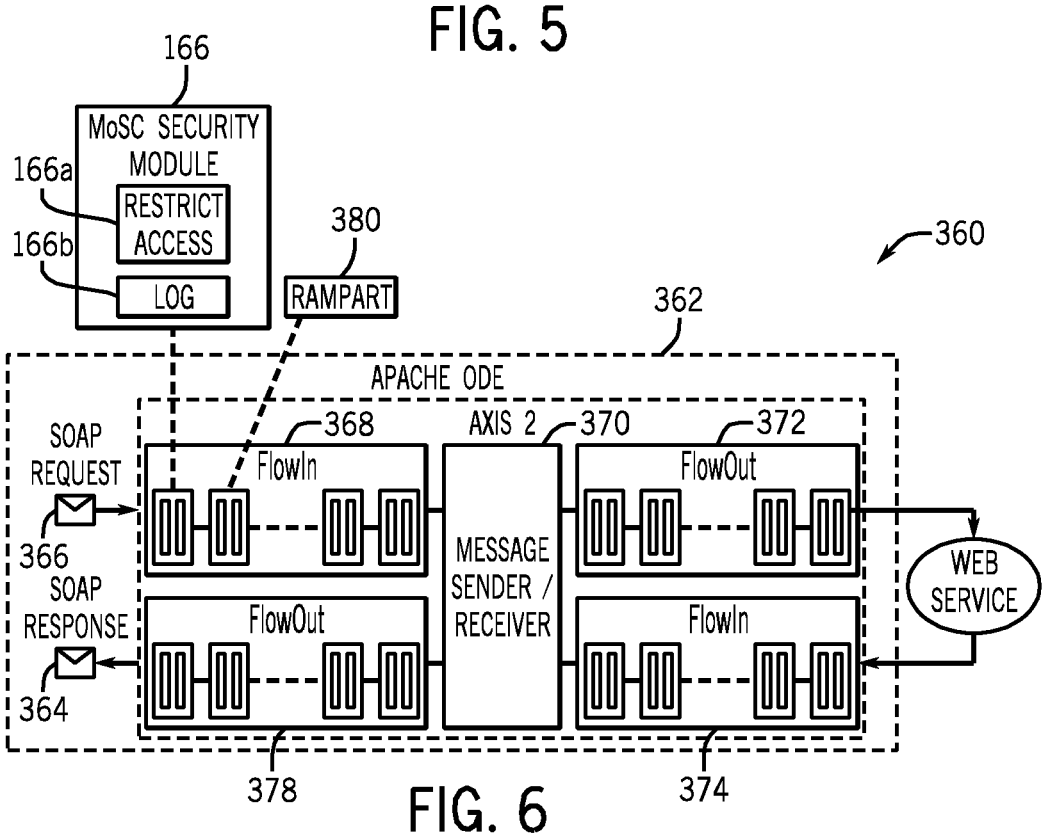
FIG. 6 is a schematic diagram of an execution environment architecture according to an example implementation.

FIG. 6 depicts a more detailed example of an exemplary execution environment architecture 360. The architecture 360 uses an Apache Orchestration Director Engine (ODE) 362 built under the framework Axis 2. The Apache ODE 362 has incoming 368 and outgoing 378 queues for Simple Object Access Protocol (SOAP) requests 366 and responses 364, respectively; outgoing 372 and incoming 374 queues for communicating with a web service; and a message sender/receiver 370. The service composition principle is based on the Axis2 message flow. The functional part of the BPM is translated to WS-BPEL 2.0 and is executed by the Apache ODE engine. Parts of the non-functional part of the BPM are handled by interceptors associated to the NF-Actions. When the Apache ODE 362 sends/receives an invocation, the SOAP message crosses the Axis2 message flow; and if the service to be invoked has an associated NF-Action, a handler will be invoked in order to perform this NF-Action.

For this example, the Apache ODE 362 has an extension module, Apache Rampart 380, which is able to handle a specific set of NF-Actions, such as cryptography, authentication and data integrity check actions, as a few non-limiting examples. However, there are some NF-Actions (such as restrict access 166a and log 166b functions, for example), which Rampart 380 is unable to manage. For these actions, the security module 166 takes over the responsibility. In this manner, auxiliary engine interceptors manage such NF-Actions as RestrictAccess and Log, for example.

The flow of messages inside the execution environment defined by the architecture 360 depends on the security requirements that are defined. For example, the implementation of the NF-Action RestrictAccess receives an invocation and then forwards it to the security module 166 that checks if the IP address in the output message has some kind of constraint. If the constraint is not satisfied, the message is not forwarded through other elements in the flowout queue 372. Otherwise (the IP address is allowed), the message is forwarded to the rampart 380, which may enforce other NF-Actions (e.g., UseCryptography). Next, the rampart 380 forwards the message to the web service that actually handles the request.

Figure 7:
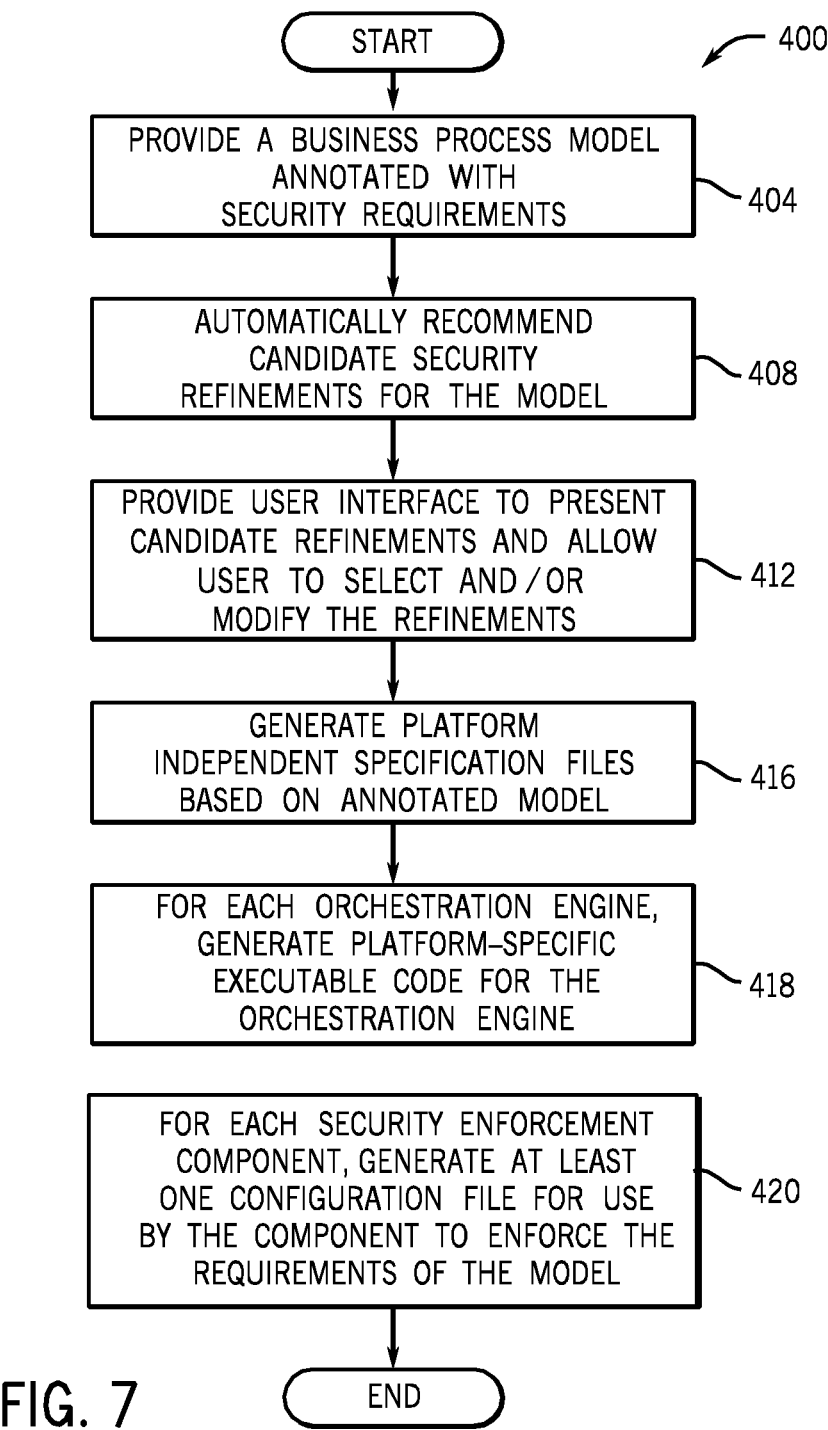
FIG. 7 is a flow chart depicting a technique to determine security requirements and services for a business process model according to an example implementation.

To summarize, in accordance with implementations, a technique 400 that is depicted in FIG. 7 may be performed. Pursuant to the technique 400, a business process model annotated with security requirements is provided, pursuant to block 404. According to the technique 400, candidate security refinements are automatically recommended for the model, pursuant to block 408. A user interface is provided (block 412) to present the candidate refinements and allow a user to select and/or modify the recommended candidate refinements to generate defined security refinements for the model. Next, pursuant to block 416, platform independent specification files are generated based on the annotated BPM. For each specific orchestration engine, platform specific executable code is generated pursuant to block 418. The platform specific executable code may then be executed by the orchestration engine, as described above. For each specific security enforcement component, at least one configuration file is generated for the specific component, pursuant to block 420. The information in the configuration file causes the security enforcement component to enforce at least one requirement from the annotated BPM.

As disclosed herein, specification and refinement of security requirements for service composition may be used to realize a business process, and the security requirements may be provided in a machine interpretable form. The editor may provide different complementary views for the business manager, the security expert and the service designer to annotate the BPM. Modeling abstractions may be provided for security requirements so that business managers may annotate business process model elements and services; and security experts may take the security requirement annotations of the business process model and specify a set of actions and properties that may realize the requirements. This may enable traceability of security requirements at different levels of abstraction. The detailed decisions made by the security expert regarding how to realize a business level security requirement with a set of specific actions may become reusable and may be stored in a repository. This approach may enable the reuse of security design decisions when a new business process is defined. Additionally, automatic generation of configuration files containing enforceable security actions for the composed services and involved security tools, which are manually created at one point, may be automatically generated at another point. The generated configuration may then be pushed into an orchestration engine or security module automatically. An auxiliary engine may be provided as a unified security enforcement interface such that the set of security attributes and actions may be enforced irrespective of the specific orchestration engine used. Moreover, the auxiliary engine may offer methods to enforce certain security requirements that are not supported in some implementations of the orchestration engine. Furthermore, security requirements may be defined once and enforced across many services and many BPMs. Other and different advantages are contemplated in accordance with the many possible implementations.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
providing a functional model of a business process, the functional model specifying steps of the business process and the steps being annotated with security requirements; and
executing instructions on a processor-based system to cause the processor-based system to, based on the functional model, automatically generate platform-specific executable code for an orchestration engine and at least one configuration file for the orchestration engine, the orchestration engine executing the steps of the business process to enforce at least some of the security requirements of the functional model.

2. The method of claim 1, further comprising:
automatically recommending candidate security refinements for the model.

3. The method of claim 2, further comprising:
providing a user interface to allow a user to define security refinements for the model based at least in part on the candidate security refinements.

4. The method of claim 3, further comprising:
automatically deploying a service composition to deliver the business process based at least in part on the defined security refinements.

5. The method of claim 2, wherein the candidate security refinements comprise at least one of the following: a cryptography action, an authentication action, an access control action, and an audit logging action.

6. The method of claim 1, further comprising:
providing modeling abstractions to express the security requirements.

7. An article comprising a non-transitory computer readable storage medium storing instructions that when executed by a computer cause the computer to:
receive data indicative of a functional model of a business process specifying steps of the process, the steps being annotated with security requirements; and
based on the model, generate platform-specific executable code for an orchestration engine and at least one configuration file for the orchestration engine, the orchestration engine executing the steps of the model to enforce at least some of the security requirements.

8. The article of claim 7, the storage medium storing instructions that when executed by the computer cause the computer to automatically recommend candidate security refinements for the model.

9. The article of claim 8, the storage medium storing instructions that when executed by the computer cause the computer to provide a user interface to allow a user to define security refinements for the model based at least in part on the candidate security refinements.

10. The article of claim 9, the storage medium storing instructions that when executed by the computer cause the computer to automatically deploy a service composition to deliver the business process based at least in part on the defined security refinements.

11. A system comprising:
an editor to provide a user interface to allow a user to annotate a functional model of a business process with security requirements; and
a translator comprising at least one central processing unit (CPU) to generate platform-specific executable code for a given security enforcement component and at least one configuration file for the given security enforcement component, the given security enforcement component to enforce the security requirements of the functional model.

12. The system of claim 11, wherein the editor is adapted to recommend candidate security refinements for the model.

13. The system of claim 12, wherein the user interface allows a user to define security refinements for the model based at least in part on the candidate security refinements.

14. The system of claim 11, wherein the editor is adapted to use modeling abstractions to express the security requirements.

* * * * *